United States Patent
Robbins

(10) Patent No.: US 7,599,829 B2
(45) Date of Patent: Oct. 6, 2009

(54) PHONETIC SEARCHING USING PARTIAL CHARACTERS

(75) Inventor: Daryn E. Robbins, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 11/192,496

(22) Filed: Jul. 29, 2005

(65) Prior Publication Data

US 2007/0027690 A1    Feb. 1, 2007

(51) Int. Cl.
  G06F 7/00   (2006.01)
  G06F 15/16  (2006.01)
  G06F 17/20  (2006.01)
  G06F 17/21  (2006.01)

(52) U.S. Cl. .............. 704/8; 704/10; 707/10; 709/206

(58) Field of Classification Search ........... 704/8
    See application file for complete search history.

(56) References Cited

U.S. PATENT DOCUMENTS

| | | | | |
|---|---|---|---|---|
| 4,980,840 A * | 12/1990 | Yin et al. | ............... | 715/210 |
| 5,526,477 A * | 6/1996 | McConnell et al. | ......... | 345/467 |
| 5,682,158 A * | 10/1997 | Edberg et al. | ................ | 341/90 |
| 6,321,226 B1 * | 11/2001 | Garber et al. | ................ | 707/10 |
| 2001/0032073 A1 * | 10/2001 | Boehme | ................... | 704/229 |
| 2002/0065794 A1 * | 5/2002 | Fruensgaard et al. | ........... | 707/1 |
| 2003/0088398 A1 * | 5/2003 | Guo et al. | ...................... | 704/8 |
| 2003/0154256 A1 * | 8/2003 | Hadano et al. | ............. | 709/206 |

* cited by examiner

Primary Examiner—David R Hudspeth
Assistant Examiner—Justin W Rider
(74) Attorney, Agent, or Firm—Merchant & Gould, P.C.

(57) ABSTRACT

Some spoken languages can be written, for example, by using a single character to represent a single word. The word can comprise a plurality of phonetic codes. A character from a datastore can be retrieved and compared against an input string which might contain the same phonetic codes.

20 Claims, 3 Drawing Sheets

PHONETIC SEARCHING USING PARTIAL CHARACTERS

BACKGROUND

Some spoken languages can be written, for example, by using a single character to represent a single word. In particular, the Korean language uses the Hangul character set.

The Hangul character set includes characters, wherein each character typically comprises several Jamo characters. The Jamo characters correspond to certain sounds of the Korean language and can be used to represent the sounds of the vowels and consonants of the Korean language.

Hangul is typically entered into a computer system by users who select groups of Jamo characters that specify desired Hangul characters. Hangul characters are typically encoded (as two bytes) using a Unicode system. The Unicode system also provides codes for Jamo characters (also two bytes-long). However, encoded Hangul characters are typically used for storing information (such as words, names, places, and the like) because of the smaller size that is required when storing information in using the encoded Hangul characters. This background information is not intended to identify problems that must be addressed by the claimed subject matter.

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to aspects of various described embodiments, implementations are provided for creating a mechanism to search words of languages that, for example, use a single character to represent a single word. The word can comprise a plurality of phonetic codes. Accordingly, a datastore is used to store data to be searched that encodes single characters of the spoken language by using phonetic codes. In one aspect, an input string is received that comprises a sequence of entered phonetic codes, such that each entered phonetic code is associated with a sound of the spoken language. A character from the data to be searched is received. The received character is decoded into a comparison string that includes a sequence of phonetic codes that is associated with the received character. Finally the phonetic codes of the input string with phonetic codes of the comparison string can be compared to determine whether a match exists, According to another aspect, a computer-implemented system includes an application interface that is configured to receive an input string that includes a sequence of entered phonetic codes. The system also includes a filter for receiving the sequence of entered phonetic code and for receiving a character from a datastore, where the characters are encoded using phonetic codes of a spoken language. The filter is also provided for decoding the received character into a comparison string that comprises a sequence of phonetic codes that is associated with the received character and for comparing the comparison string with the sequence of entered phonetic codes.

According to another aspect, a computer-implemented system includes means for receiving an input string that comprises a sequence of entered phonetic codes. A datastore means is provided for storing and retrieving characters in a database that are encoded using phonetic codes of a spoken language. A filter means receives the sequence of entered phonetic code, receives a character from the datastore means, decodes the received character into a comparison string that includes a sequence of phonetic codes that is associated with the received character; and compares the comparison string with the sequence of entered phonetic codes.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Hangul is typically entered into a computer system by users who select Jamo characters that define and/or are associated with the desired Hangul characters. For example, a user (who desires to create, maintain, and use a contact list) can enter Jamo characters for a contact on a PDA that are converted by the PDA to Hangul characters. When searching for the contact names using Hangul characters, the process of matching contacts cannot occur until a full Hangul character is completed.

Because Hangul characters are composed of Jamo characters which then are converted into partial Hangul characters and then into a complete Hangul character, the search mechanism cannot operate during the input of the partial Hangul (or even partial Jamo) characters. In conventional systems, the entire contact list is erroneously filtered out when the system attempts to search for a Jamo character because the contact list uses Hangul, rather than Jamo.

In accordance with aspects of the present invention, Jamo characters (or partial Hangul characters) are compared with full Hangul characters if they are phonetically equivalent. When a Hangul character is used in a contact name, this functionality allows the user to be able to enter Jamo (and partial Jamo) characters when searching, and to retrieve accurate search results during and after input of the Jamo characters that comprise a Hangul character. Accordingly, partial characters can be used to phonetically search a contact list for matches. The matching algorithm can operate in accordance with the character boundaries of the contact list.

Exemplary System for Phonetic Searching of Partial Characters

Figure 1:
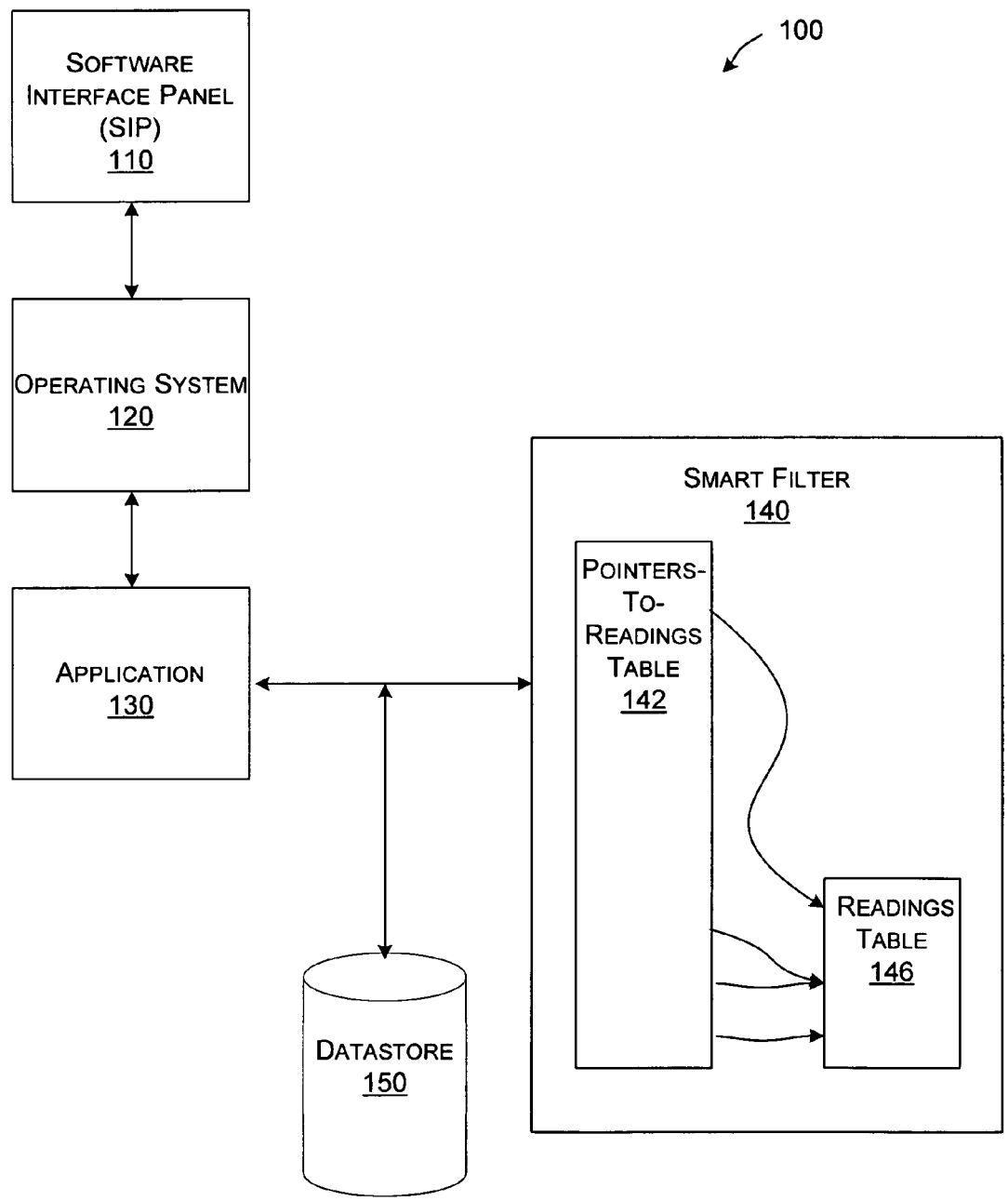
FIG. 1 illustrates an exemplary phonetic searching system 100 that can a phonetically search using partial characters, according to one embodiment.

FIG. 1 illustrates an exemplary phonetic searching system 100 that can a phonetically search using partial characters, according to one embodiment. In one embodiment, system 100 is implemented on a computer system, such as a mobile device, PDA, cell phone, and the like. System 100 comprises a software interface panel (110), an operating system (120), an application (130), a smart filter (140), and a datastore (150). In various embodiments, these (and other components) may be integrated logically and/or physically in various hardware/software configurations of components.

Software interface panel (SIP) 110 is any component that is configured to receive an input string from a user of system 100. In typical environments (such as in a mobile device), SIP 110 comprises a keypad using, for example, buttons and/or a display and touch screen combination. In operation, a user can use the SIP to enter an input string that corresponds to sounds (e.g., readings and/or phonetics) of a spoken language, such as Korean. For example, the input string can be an initial set of sounds for a name and a contact list for which the user desires to obtain stored information.

Operating system 120 is configured to operate SIP 110 as implemented, and in particular to handle the user interface such that an input string entered by a user can be retrieved. Operating system 120 notifies application 130 of the input string (or a change in the input string), typically through the use of an edit control. Accordingly, operating system 120 can inform application 130 of each change to the input string.

Application 130 is configured to receive the input string from operating system 120. Application 130 parses the input string to determine the phonetic codes specified by the input string. After application 130 determines which phonetic codes have been specified, the application attempts to match the specified phonetic codes from the input string with information from datastore 150. As mentioned above, datastore 150 can be, for example, a contact list. The contact list can be a list of the user's personal contacts that uses the names of contacts as entry points into the contact list. Alternatively (and/or conjunctively), datastore can be any stored data in which the user desires to perform searching.

The names of the contacts are typically stored as characters, wherein each character can comprise one or more sounds (identified by the "Jamo" in a Korean language embodiment) that are encoded into a particular character. Accordingly, application 130 uses smart filter 140 to decode particular characters into their constituent sounds. Application 130 can then match the decoded constituent sounds with the specified phonetic codes from the input string in accordance with rules of the spoken language and character boundaries.

In one example, the smart filter comprises tables for performing look-up based decoding of the sounds (e.g., Jamo) encoded in a character. The Unicode can be used as an index for a particular character, and the table (pointers-to-readings table 142) contains pointers that point to potential readings (readings table 146) that are associated with the particular character. Accordingly, the smart filter can return the constituent Jamo by use of look-up tables.

In another example (using a language having relatively defined character rules, such as Korean, as mentioned below), the smart filter can comprise logic for decoding supplied characters. For example, each call to the smart filter has the specified phonetic codes (that are to be matched) and one contact name from the contact list. (Additional calls using other names from the contact list can be made such that the entire contact list can be searched by name.) For each call, the smart filter then takes each character of the contact name and extracts the phonetic codes (e.g., Jamo codes) used to create the character (e.g., Hangul character).

Extracting the Jamo can be algorithmically accomplished by using the Unicode 2 definition of Hangul characters. The order of a Hangul character in the Unicode 2 character set is based on all the possible beginning, middle, and ending Jamo that make up the Hangul character. In accordance with rules of the Korean language (and the encoding used in the Unicode 2 system), the Jamo can be the algorithmically extracted in accordance with the following algorithm:

```
iHangulIndex = chChar – FIRST_HANGUL;
//Break the Hangul down into the three constituent Jamo characters
iCho = gc__rgCho[iHangulIndex/(MAX__JUNG*MAX__JONG)];
iJung =
c__rgJung[(iHangulIndex%(MAX__JUNG*MAX__JONG))/MAX_JONG];
iJong = gc__rgJong[iHangulIndex%MAX__JONG];
```

The iCho character is the index into the list of Jamo characters (in the Unicode 2 system) for the beginning consonant, the ijung is the index into the list of Jamo characters for the middle vowel and the ijong is the index into the list of Jamo characters for the ending consonant. Additional logic can be added to handle additional language rules, such as having a third consonant in a single Hangul character. If ambiguities exist in the language rules, each possible case can be individually searched using additional and/or recursive calls to the search routine, which compares the constituent sounds of the input and contact strings.

Once the decoded constituent sounds (e.g., Jamo characters that make up a Hangul character) are determined from the contact list entry, the search string (containing the input phonetic codes) is compared against the decoded constituent sounds of the contact list entry. If the characters in the search string are also Jamo, a relatively simple comparison can be made. If, for example, the content of the search string is a partial Hangul character, then the partial Hangul character should also be decoded into its constituent Jamo characters for purpose of comparing entities that are alike. The partial Hangul character can be decoded into its constituent Jamo characters in much the same way as the full Hangul characters are decoded in various ways as described above.

Once the search string is broken down into its constituent Jamo characters, the search string Jamo characters can then compared against the Jamo characters derived from the contact name. Each successive character in both (search and contact) strings is typically decomposed into corresponding Jamo characters such that if they continue to match then the smart filter returns an answer that they do match. If the full search string matches the beginning of the contact name string we also return that they do match. However, the smart filter returns an answer of no match if at any point the Jamo characters do not match.

Although a Korean language embodiment is described above, other embodiments may be used with other languages that use characters that include a plurality of phonetic codes.

Depending on the order of the data within the datastore, various methods can be used to search the entire datastore for particular entries.

Exemplary Flow for Phonetic Searching of Partial Characters

Figure 2:
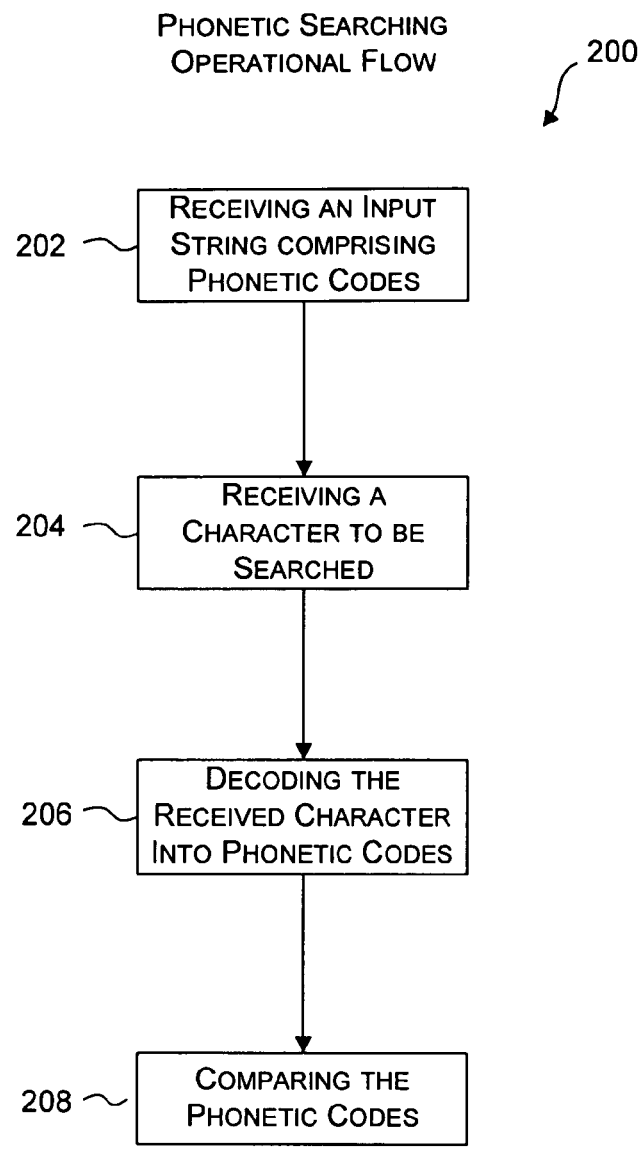
FIG. 2 illustrates an operational flow 200 for phonetic searching of partial characters, according to one embodiment.
Figure 3:
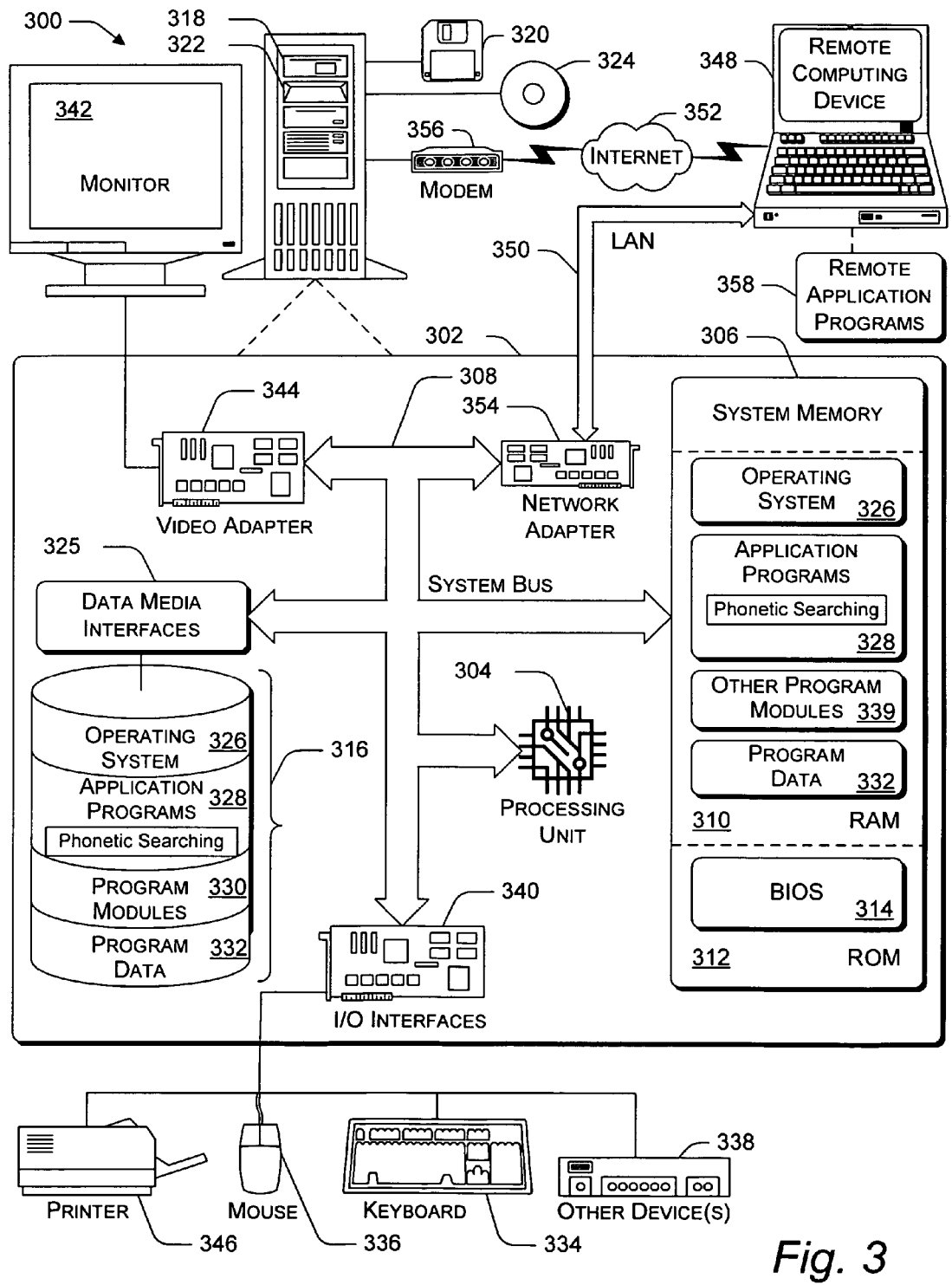
FIG. 3 illustrates a general computer environment 300, which can be used to implement the techniques described herein.

FIG. 2 illustrates an operational flow 200 for phonetic searching of partial characters, according to one embodiment. Operational flow 200 may be performed in any suitable computing environment. For example, operational flow 200 may be executed by an application such as user application 130 (FIG. 1) or application programs 328 (FIG. 3, below) to perform the searching and comparison. Therefore, the description of operational flow 200 may refer to at least one of the components of FIGS. 1 and 3. However, any such reference to components of FIGS. 1 and 3 is for descriptive purposes only, and it is to be understood that the implementations of FIGS. 1 and 3 are a non-limiting environment for operational flow 200.

At a block 202, an input string comprising phonetic codes is received. Each single character of a spoken language is typically encoded using various phonetic codes. In one embodiment, the phonetic codes are entered by a user using text and/or graphical entry. The user can concatenate the input string with additional entries such that the input string comprises entered phonetic codes that are sufficient to identify a sequence of single characters of the spoken language.

At a block 204, at least one character to be searched is received from data to be searched. The data to be searched can be, for example, a contact list that has entries, wherein each entry comprises a sequence of single characters of the spoken language to be searched. Each entry may contain, for example, a person's name and contact information. A sequence of characters from a data entry can be searched, and decoded into a sequence of phonetic codes that are associated with the additional received characters, such that the phonetic codes of the input string are compared with the sequence of phonetic codes that are associated with the additional received characters.

At block 206, the received character is decoded into phonetic codes. The phonetic codes are a sequence of phonetic codes that is associated with the received character. In an embodiment, the received characters are decoded in accordance with rules of the spoken language (such as Korean). For example, characters can be encoded (and decoded) using rules that specify that each character requires at least one vowel, that the vowel follow an initial consonant if any consonants are present, and that any additional consonants (without intervening consonants) follow the vowel. Accordingly, character boundaries can be determined, and searches using phonetic codes (of a partial character that might not specify a complete character) for searching various characters that might comprise those phonetic codes. As additional codes are entered by the user and a character boundary identified, a character match can be established, and another character from the data to be searched can be retrieved for decoding and searching.

At block 208, the phonetic codes of the input string are compared with phonetic codes of the comparison string. A search routine can comprise function calls for comparison of the strings (looking for the presence or absence of matches, for example). In accordance with the example rules above, character boundaries can be determined, and searches performed in accordance with the boundaries.

Illustrative Operating Environment

FIG. 3 illustrates a general computer environment 300, which can be used to implement the techniques described herein. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the example computer environment 300.

Computer environment 300 includes a general-purpose computing device in the form of a computer 302. The components of computer 302 can include, but are not limited to, one or more processors or processing units 304, system memory 306, and system bus 308 that couples various system components including processor 304 to system memory 306.

System bus 308 represents one or more of any of several types of bus structures, including a memory bus or memory controller, a peripheral bus, an accelerated graphics port, and a processor or local bus using any of a variety of bus architectures. By way of example, such architectures can include a Peripheral Component Interconnects (PCI) bus also known as a Mezzanine bus, a PCI Express bus (and the like), a Universal Serial Bus (USB), a Secure Digital (SD) bus, and/or an IEEE 1394, i.e., FireWire, bus.

Computer 302 may include a variety of computer readable media. Such media can be any available media that is accessible by computer 302 and includes both volatile and non-volatile media, removable and non-removable media.

System memory 306 includes computer readable media in the form of volatile memory, such as random access memory (RAM) 310; and/or non-volatile memory, such as read only memory (ROM) 312 or flash RAM. Basic input/output system (BIOS) 314, containing the basic routines that help to transfer information between elements within computer 302, such as during start-up, is stored in ROM 312 or flash RAM. RAM 310 typically contains data and/or program modules that are immediately accessible to and/or presently operated on by processing unit 304.

Computer 302 may also include other removable/non-removable, volatile/non-volatile computer storage media. By way of example, FIG. 3 illustrates hard disk drive 316 for reading from and writing to a non-removable, non-volatile magnetic media (not shown), magnetic disk drive 318 for reading from and writing to removable, non-volatile magnetic disk 320 (e.g., a "floppy disk"), and optical disk drive 322 for reading from and/or writing to a removable, non-volatile optical disk 324 such as a CD-ROM, DVD-ROM, or other optical media. Hard disk drive 316, magnetic disk drive 318, and optical disk drive 322 are each connected to system bus 308 by one or more data media interfaces 325. Alternatively, hard disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, removable magnetic disk 320, and removable optical disk 324, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 316, magnetic disk 320, optical disk 324, ROM 312, and/or RAM 310, including by way of example, operating system 326, one or more application programs 328 (which can include phonetic searching as described above), other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as keyboard 334 and a pointing device 336 (e.g., a "mouse"). Other input devices 338 (not shown specifically) may include a microphone, joystick, game pad, satellite dish, serial port, scanner, and/or the like. These and other input devices are connected to processing unit 304 via input/output interfaces 340 that are coupled to system bus 308, but may be connected by other interface and bus structures, such as a parallel port, game port, or a universal serial bus (USB).

Monitor 342 or other type of display device can also be connected to the system bus 308 via an interface, such as video adapter 344. In addition to monitor 342, other output peripheral devices can include components such as speakers (not shown) and printer 346 which can be connected to computer 302 via I/O interfaces 340.

Computer 302 can operate in a networked environment using logical connections to one or more remote computers, such as remote computing device 348. By way of example, remote computing device 348 can be a PC, portable computer, a server, a router, a network computer, a peer device or other common network node, and the like. Remote computing device 348 is illustrated as a portable computer that can include many or all of the elements and features described herein relative to computer 302. Alternatively, computer 302 can operate in a non-networked environment as well.

Logical connections between computer 302 and remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, computer 302 is connected to local network 350 via network interface or adapter 354. When implemented in a WAN networking environment, computer 302 typically includes modem 356 or other means for establishing communications over wide network 352. Modem 356, which can be internal or external to computer 302, can be connected to system bus 308 via I/O interfaces 340 or other appropriate mechanisms. It is to be appreciated that the illustrated network connections are examples and that other means of establishing at least one communication link between computers 302 and 348 can be employed.

In a networked environment, such as that illustrated with computing environment 300, program modules depicted relative to computer 302, or portions thereof, may be stored in a remote memory storage device. By way of example, remote application programs 358 reside on a memory device of remote computer 348. For purposes of illustration, applications or programs and other executable program components such as the operating system are illustrated herein as discrete blocks, although it is recognized that such programs and components reside at various times in different storage components of computing device 302, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method for searching data, the method comprising:
   using a plurality of phonetic codes to encode single characters of a spoken language;
   receiving at least a partial character, wherein the at least a partial character is associated with a sound of the spoken language;
   beginning a search for matches before an entire character is input by performing steps, comprising:
   receiving a character from the data to be searched;
   decoding the received character into a comparison string that comprises a sequence of phonetic codes that is associated with the received character; and
   comparing at least one phonetic code of the at least partial character with phonetic codes of the comparison string; and
   returning a result on a display of a computing device based on the comparison when a match is found.

2. The method of claim 1 wherein the data to be searched is entered by a user.

3. The method of claim 1 wherein the data to be searched is a contact list.

4. The method of claim 3 wherein the received partial character is associated with a name stored in the contact list.

5. The method of claim 1 further comprising assembling received partial characters into an input string; wherein the input string comprises entered phonetic codes that are sufficient to identify a sequence of single characters of the spoken language.

6. The method of claim 5 wherein additional characters are received from the data to be searched, decoded into a sequence of phonetic codes that are associated with the additional received characters, such that the phonetic codes of claim 5 are compared with the sequence of phonetic codes that are associated with the additional received characters.

7. The method of claim 1 wherein the received characters are decoded in accordance with rules of the spoken language.

8. The method of claim 1 wherein the comparing of phonetic codes is performed recursively in response to rules of the spoken language.

9. A computer-implemented system for phonetically searching character data, the system comprising:
   a processor and a computer-readable storage medium;
   an operating environment stored on the computer-readable storage medium and executing on the processor and that is configured to interact with:
   an application interface that is configured to receive an input string that comprises a partial character of a spoken language; and
   a filter that is configured to receive the partial character, that is configured to receive a character from a datastore, wherein the characters are encoded using phonetic codes of a spoken language, that is configured to decode the received character into a comparison string that comprises a sequence of phonetic codes that is associated with the received character; and that is configured to compare the comparison string with the partial character and returning a result based on the comparison when a match is found.

10. The system of claim 9 wherein the text to be searched is entered by a user.

11. The system of claim 9 wherein the data to be searched is a contact list.

12. The system of claim 11 wherein the received partial character is associated with a name stored in the contact list.

13. The system of claim 9 further comprising assembling received partial characters into an input string; wherein the input string comprises entered phonetic codes that are sufficient to identify a sequence of single characters of the spoken language.

14. The system of claim 9 wherein the partial character decoded in accordance with rules of the spoken language.

15. A computer-implemented system for phonetically searching character data, the system comprising:
   a processor and a computer-readable storage medium;
   an operating environment stored on the computer-readable storage medium and executing on the processor and that is configured to interact with;
   an interface means for receiving a partial character that represents a phonetic code;
   a datastore means for storing and retrieving characters in a database that are encoded using phonetic codes of a spoken language;
   a filter means for receiving the partial character, is configured to receive a character from the datastore means, for decoding the received character into a comparison string that comprises a sequence of phonetic codes that is associated with the received character; and for comparing the comparison string with the partial character and returning a result based on the comparison when a match is found.

16. The system of claim 15 wherein the data to be searched is initially entered by a user.

17. The system of claim 15 data to be searched is a contact list.

18. The system of claim 17 wherein the received partial character is associated with a name stored in the contact list.

19. The system of claim 18 further comprising assembling received partial characters into an input string; wherein the input string comprises entered phonetic codes that are sufficient to identify a sequence of single characters of the spoken language.

20. The system of claim 18 wherein additional characters are received from the datastore means, decoded into a sequence of phonetic codes that are associated with the additional received characters, such that some of the phonetic codes of the input string are compared with the sequence of phonetic codes that are associated with the additional received characters.

* * * * *